United States Patent [19]

Lindström et al.

[11] Patent Number: 5,446,781
[45] Date of Patent: Aug. 29, 1995

[54] TESTING OF SUBSCRIBER LINES IN A DIGITAL SWITCH

[75] Inventors: Anders O. Lindström, Vällingby; Anna K. Boström, Solna; Hans M. Broberg, Hägersten, all of Sweden

[73] Assignee: Telefonaktiebolaget LM Ericsson, Stockholm, Sweden

[21] Appl. No.: 221,232

[22] Filed: Mar. 31, 1994

[30] Foreign Application Priority Data

Apr. 1, 1993 [SE] Sweden ............... 9301090

[51] Int. Cl.⁶ .............. H04M 1/24; H04M 3/08; H04M 3/22
[52] U.S. Cl. ....................... 379/6; 379/2; 379/5; 379/26; 379/27; 379/29; 379/30
[58] Field of Search ............ 379/2, 5, 6, 26, 27, 379/29, 30; 370/13, 15

[56] References Cited

U.S. PATENT DOCUMENTS

| | | | |
|---|---|---|---|
| 4,070,554 | 1/1978 | Rule et al. ............ | 179/2 A |
| 4,207,433 | 6/1980 | Bartholomay ......... | 370/13 |
| 4,660,194 | 3/1987 | Larson ................ | 370/15 |
| 4,688,209 | 8/1987 | Banzi ................. | 379/5 |
| 4,766,594 | 8/1988 | Ogawa ................ | 379/5 |
| 4,943,993 | 7/1990 | Fore ................... | 379/6 |
| 5,081,666 | 1/1992 | Blaschek ............. | 379/5 |
| 5,166,923 | 11/1992 | Ohmori ............... | 379/5 |
| 5,274,692 | 12/1993 | Lechner .............. | 379/6 |

FOREIGN PATENT DOCUMENTS 2158326  11/1985  United Kingdom.

Primary Examiner—Stephen Chin
Assistant Examiner—Vijay Shankar
Attorney, Agent, or Firm—Burns, Doane, Swecker & Mathis

[57] ABSTRACT

A device for testing line connections at a telephone exchange includes a combined generator and comparator for generating a bit sequence of pseudo-random type and for comparing a received bit sequence to a generated bit sequence. A generated bit sequence is through a line connection forwarded to a telephone set and back again to the generator and comparator, where the received sequence is compared to the forwarded one. The number of bit errors occurring in the transmission is a measure of the transmission quality of the connection. A selector device selects one of several line connections which is to be tested. Only one testing device is required for testing a number of line connections which through the same pair of one serial output line and one serial input line are connected to a telephone exchange.

2 Claims, 5 Drawing Sheets

TESTING OF SUBSCRIBER LINES IN A DIGITAL SWITCH

BACKGROUND

The present invention relates to digital switches, in particular digital private branch exchanges (PBX) or local digital exchanges and the testing of a connection between a switch and a subscriber set.

In telephone networks such as for instance a private branch exchange or local digital exchange having telephone sets connected through line boards, there is always a possibility that some line will be incorrect due to a faulty attachment, loosened or oxidized terminal contacts, faults in a line circuit board, etc. Then some suitable method is used for localizing the fault, so that for instance faulty line board can be replaced. There is thus a general need of simple devices for testing the quality of a connection.

Previously, external instruments have been connected for testing line connections by means of bit error measurements, i.e. if a bit sequence transmitted on a line will arrive unchanged to the source transmitting the sequence.

In the published patent application GB-A 2 158 326 a device is disclosed for testing a digital exchange, in particular a connection between the exchange and a subscriber set. A bit sequence formed from pseudo random numbers is transmitted from the exchange on a channel and is transmitted back from a desired point in the connecting path between the exchange and the subscriber set. After each retransmission the bit sequence is tested and its state will indicate if there is a fault. By a successive use of several different retransmitting positions along the connection path the position of a fault can be determined.

In U.S. Pat. No. 4,070,554 a digital telephone system is disclosed comprising a test center for digitally testing the lines between an exchange and the telephone sets. A digital test signal transmitted from the test center is modified in a telephone set at the end of a line under test in a particular way and the modified signal is transmitted back to the exchange. At the test center, the returned signal is compared with a similarly modified non-transmitted test signal. The test center can be located anywhere in the telephone system, allowing any selected subscriber line to be selected for a test. The center is not physically connected to any particular group of subscriber line connections.

A test equipment which also is centrally connected to a digital network is disclosed in the published patent application JP-A 59-109070, publ. No. 60-251751.

SUMMARY

It is a purpose of the invention to provide a simple and cost-saving device for testing line connections to telephone sets in a local digital telephone exchange.

It is another purpose of the invention to provide a device for testing line connections to telephone sets in a local digital telephone exchange which can easily be incorporated in the logic circuits required for handling the transmission between the exchange and line circuits connected to subscriber lines.

A line circuit board comprising several line circuits for connection of individual telephone sets to a private branch exchange using digital transmission has been provided with the possibility to transmit on each line from the line circuit board, a bit sequence for testing the transmission on and the function of a selected line circuit and its associated subscriber line. On the line board there is thus a combined generator of the pseudo random numbers and a receiver. The receiver tests that the received bit sequence agrees with the transmitted one. A microprocessor further controls the start of the testing procedure and the line circuit and subscriber line to be tested.

With such a structure of the line circuit board all line circuits can be tested simply and rapidly in the manufacture of the board without any extra measures and costs therefore. Further, bit error measurements can in a simple way be made in the field for for instance testing the transmission quality of existing lines connected to the line circuits.

Generally, communication between a digital exchange and connected subscriber telephone sets and possible other devices is performed serially, on one single line or lead for transmission of information from the exchange to the subscriber sets and on one single line or lead for transmission of information from the subscriber sets to the exchange. Each telephone set is assigned fixed time slots in information frames transmitted from and to the exchange. A line circuit or unit for each telephone line handles the extraction and insertion of information associated with the connected telephone line. In this general environment a switch or multiplexer is arranged for insertion of special testing information in the line carrying information from the exchange. The switch is timed to insert testing information in the correct time slot for a selected subscriber line or equivalently the corresponding line circuit, it also being called a selected line circuit. Also the extraction of information on the line to the exchange is timed by an appropriate signal to retrieve information in selected time slots associated with the selected subscriber line or line circuit. The extraction may be performed by a simple switching element or gate connected to a shift register and controlled by suitable signals.

BRIEF DESCRIPTION OF THE DRAWINGS

In order that the invention may more readily be understood particular embodiments will now be described in detail with reference to the accompanying drawings, in which FIG. 1 schematically shows a line testing device in a digital exchange having connected telephone sets.

DETAILED DESCRIPTION

Figure 1:
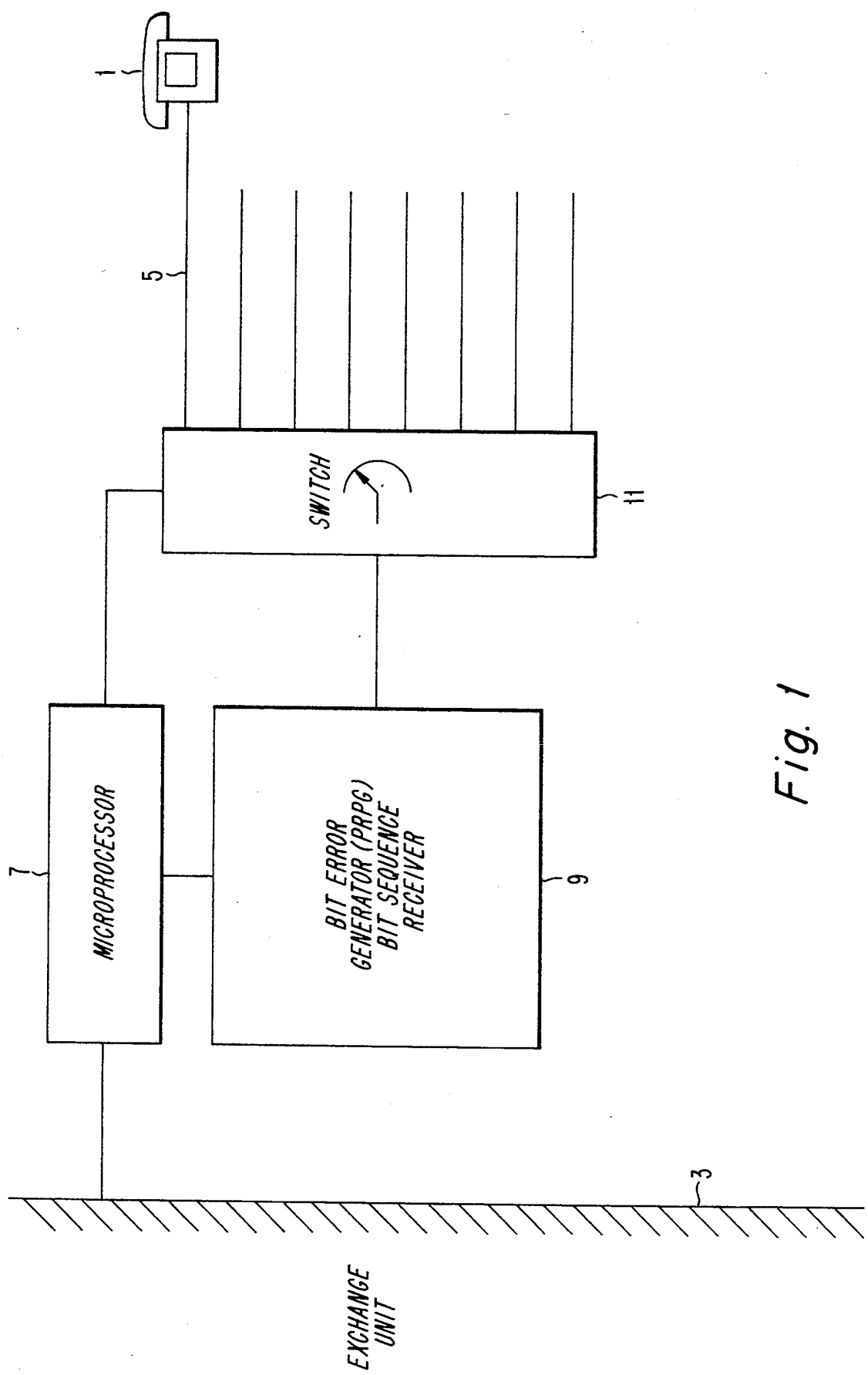

In FIG. 1 a device for the test of connection lines to individual telephone sets 1 from a telephone exchange is shown very schematically, the real exchange unit of which is shown at 3. Between the exchange unit 3 and the individual telephone lines 5 connected to the telephone sets 1 there are control and adaption circuits. They comprise in particular a microprocessor 7, which is connected to the real exchange unit 3 and in addition controls various adaption and transmission circuits not shown in FIG. 1. For the testing of telephone lines intended here a bit sequence generator and receiver 9 and a multiplexer/demultiplexer or switch 11 are arranged, which through a line is connected to the bit sequence generator and receiver 9 and through its other connections is connected to the individual telephone lines 5.

When a certain telephone line is to be tested, the microprocessor 7 commands a start of the bit sequence generator/receiver 9, such that it will start the testing procedure. It will then start generating pseudo random numbers and transmit the corresponding bit sequence. The bit sequence is transmitted in the shape of partial sequences having a predetermined number of bits, for instance as characters of eight bits, to the switch 11, which, controlled by the microprocessor 7, will forward these partial sequences on the intended telephone line 5. In the individual telephone set 1 a retransmission or return loop is arranged, such that the partial sequence in the transmitted bit sequence will first pass up to the telephone set on the line 5 and then back again on the line 5. The lines indicated in the figure as a single drawing line are generally bidirected and thus consist of physically at least two lines. The partial sections of the bit sequence then return to the switch 11 and are forwarded therefrom on a single line to the bit sequence generator/receiver 9.

In the reception of the portions of this bit sequence, the bit sequence is regenerated and the bit sequence generator and receiver 9 compares it to the bit sequence earlier forwarded. It can be made bit to bit, i.e. a test that the first received bit in the bit sequence is correct, after that the second received bit etc. If an agreement is obtained in the comparison of a great number of received bits to the earlier generated ones, the telephone line is probably correct, and otherwise the line can be incorrect. The fact that a bit sequence error has occurred can then be stored in a memory (not shown) particular for the tested telephone line. For instance, a counter may be arranged for this particular connection line and the counter be incremented each time when a lack of agreement is found in the comparison of a received bit. By means of some suitable output means, compare the item 32 in FIG. 3, e.g. a display device or a monitor, which can manually be connected to the exchange unit 3 or to the memory where the bit sequence errors are stored, one can have a visual indication of the number of faults. Other possibilities of indication are of course possible, such as by means of indicator lamps or by means of a printer arranged in the exchange unit 3, which is arranged to print the number of bit sequence errors which have occurred on the individual telephone lines 5.

Figure 2:
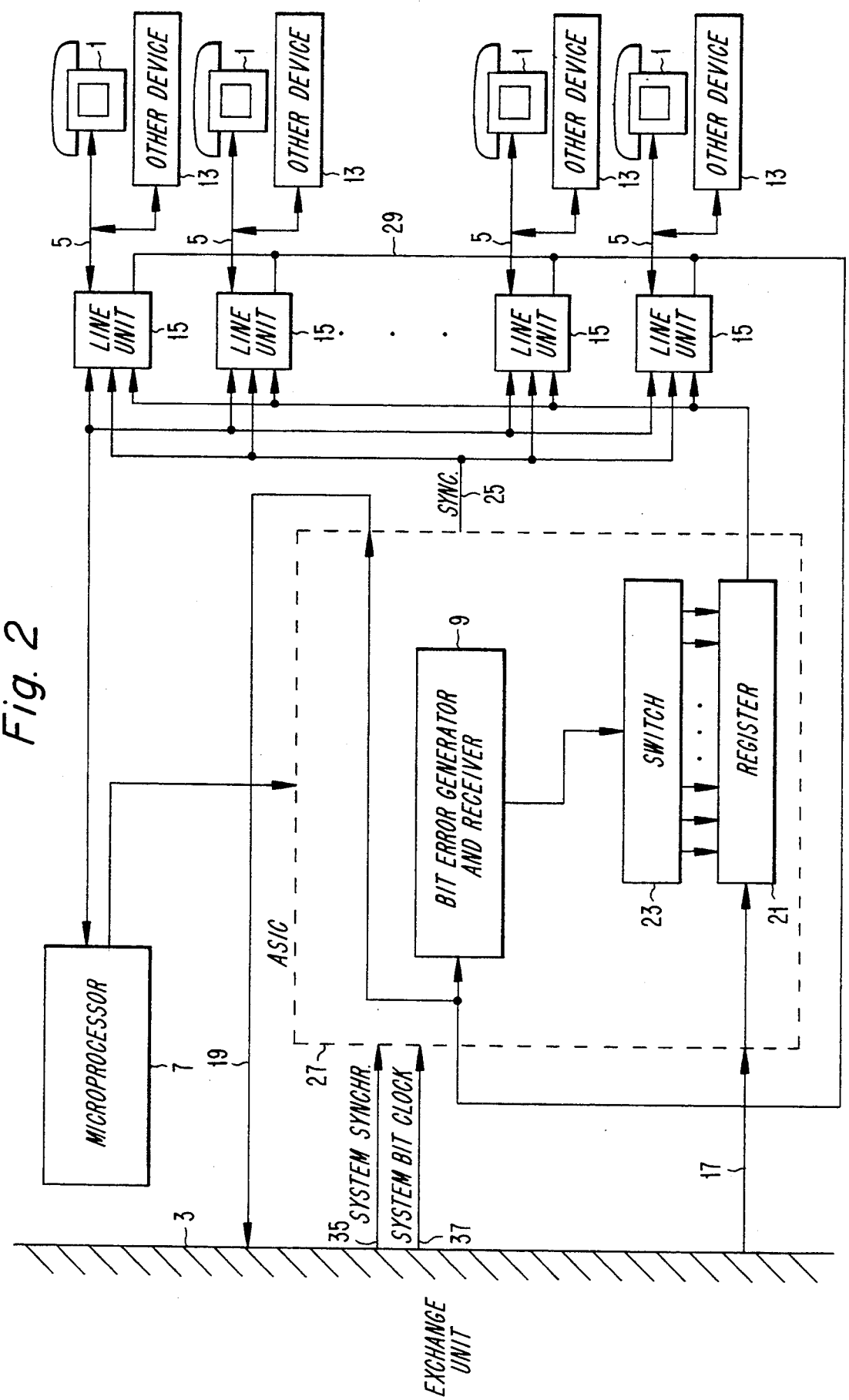
FIG. 2 shows a more detailed block diagram of the line testing device.

In FIG. 2 is shown in more detail a possible of construction the test device schematically shown in FIG. 1. Also FIG. 2 is schematic, however, by the fact that for instance not all individual control lines between the exchange unit 3 and the micro processor 7, from the microprocessor 7 to the different units in the testing device, various lines carrying synchronizing signals from the exchange unit 3 and from internal clock circuits in the testing device are not shown. The circuits particular to the invention are advantageously arranged in a single application specific integrated circuit, ASIC 27.

In FIG. 2 the individual telephone lines 5 are also drawn as single lines. In parallel to each telephone set 1 some other device 13 may be arranged, which can send and/or receive messages or information on the telephone lines 5, for instance modems connected to or located inside computers or telefax devices. For each telephone line 5 further a line circuit, called hereinafter line unit, 15 is arranged. The line units 15 generally perform the operations required for the simultaneous communication between a number of, for instance 16, telephone lines 5 and the exchange unit 3 by means of one single line 17 for transmission of information from the exchange unit 3 to the telephone sets 1 and other apparatus 13 and one single line 19 for the transmission of information from the telephone sets 1 or possible other devices 13 to the exchange unit 3, the transmission being performed by means of serial time divided communication.

The communication between the exchange unit 19 and the telephone sets 1/other units 13 is in the embodiment shown here thus performed serially. The general format of the communication for the line units 15 on the lines 17 and 19 with the exchange unit is indicated at the top of FIG. 4. It is here presupposed that there are 16 telephone lines 5, to which telephone sets 1 and/or other sources/destinations 13 for messages can be connected and which are controlled by the devices shown. 32 successive time slots, No. 0, No. 1, No. 2, ..., No. 30, No. 31, form a frame in which determined time slots are assigned to each telephone line 5 and thus to each line unit 15, for instance in such a way that the first time slot belongs to telephone line No. 1, the following slot is associated with telephone line No. 2, etc., with a cyclical repetition when all telephone lines are exhausted. Within each time slot a number of binary numbers can be forwarded, for instance a byte comprising eight bits.

The transfer of information in the device shown is further supposed to be controlled by various clock signals or synchronizing pulses, i.e. by means of a hardware control, compare FIG. 4, by means of which the start of a time slot can be obtained directly or indirectly by the circuits handling the transmission. The whole time such serial frames of 32 bytes are transmitted both from the exchange unit 3 on the connection line 17 and to the exchange unit 3 on the connection line 19. All the bit patterns in the characters in such a frame will of course not in most cases contain useful information, since there is not always an active sender/receiver of messages for all telephone lines simultaneously. These bytes, which do not contain any useful information, can then be used for forwarding test bit patterns on a telephone line for testing it.

The connection line 17 from the exchange unit 3 stores its information intermediately in a register 21 and at this occasion in this register, a partial sequence of the test bit pattern which has been generated by the bit sequence generator and receiver 9, is inserted in the register 21 and hereby in the frame stored therein. The section of random number bits are placed at the correct position in the register 21 by means of a switch 23. The correct place thus corresponds to a time slot belonging to the line circuit 15 and the telephone line 5 attached thereto which is to be tested. The frame modified in this way then arrives to each line unit 15, in which the characters in the frame associated with this line unit 15 and the associated line 5 and telephone set 1 are extracted and forwarded on the attached line 5, controlled by synchronizing pulses on a line 25, which by means not shown are generated inside the circuit 27. A line unit 15 thus forwards the two characters taken from the frame which belong to the telephone line 5 connected to the line unit 15 and further other information, in particular two data bits originating from the microprocessor 7. These data bits contain other testing or control information and they are used for the application shown here when a command of forwarding a test bit sequence has been issued, to operate a return or retransmission loop (not shown) inside the telephone set 1 and the other possible sender/receiver device 13 respectively, such that the characters will be forwarded and return on the line 5 to the line unit 15.

Also, in this retransmission there is for every two transmitted characters two extra data bits. They are extracted by the line unit 15 and are transferred to the micro processor 7. On the common output line 29 from all line units 15 in the direction towards the exchange unit 3 again a frame is formed having the format shown at the top of FIG. 4. The frame and the information contained therein is transferred directly to the exchange unit 3 through the line 19 and through the circuit 27 but some information in the frame may also be retrieved by the bit sequence generator and receiver 9. Controlled by a synchronizing pulse suitably arranged in time the bit sequence generator and receiver 9 may thus select, from the received frame, the correct slot for a selected telephone line to be tested and extract the character which contains information from this telephone line. The extracted information can, if a sufficient time has passed, after that a random number bit sequence has started to be forwarded, be supposed to contain a subsequence of this bit sequence and the bit sequence generator and receiver 9 will then compare the bit pattern of the character received to earlier forwarded parts of the bit sequence. By means of a particular procedure which will be described below with reference to FIG. 5, in the reception of characters the start of the forwarded bit sequence may be recognized and the real determination of the number of errors in the transmission be counted.

Figure 3:
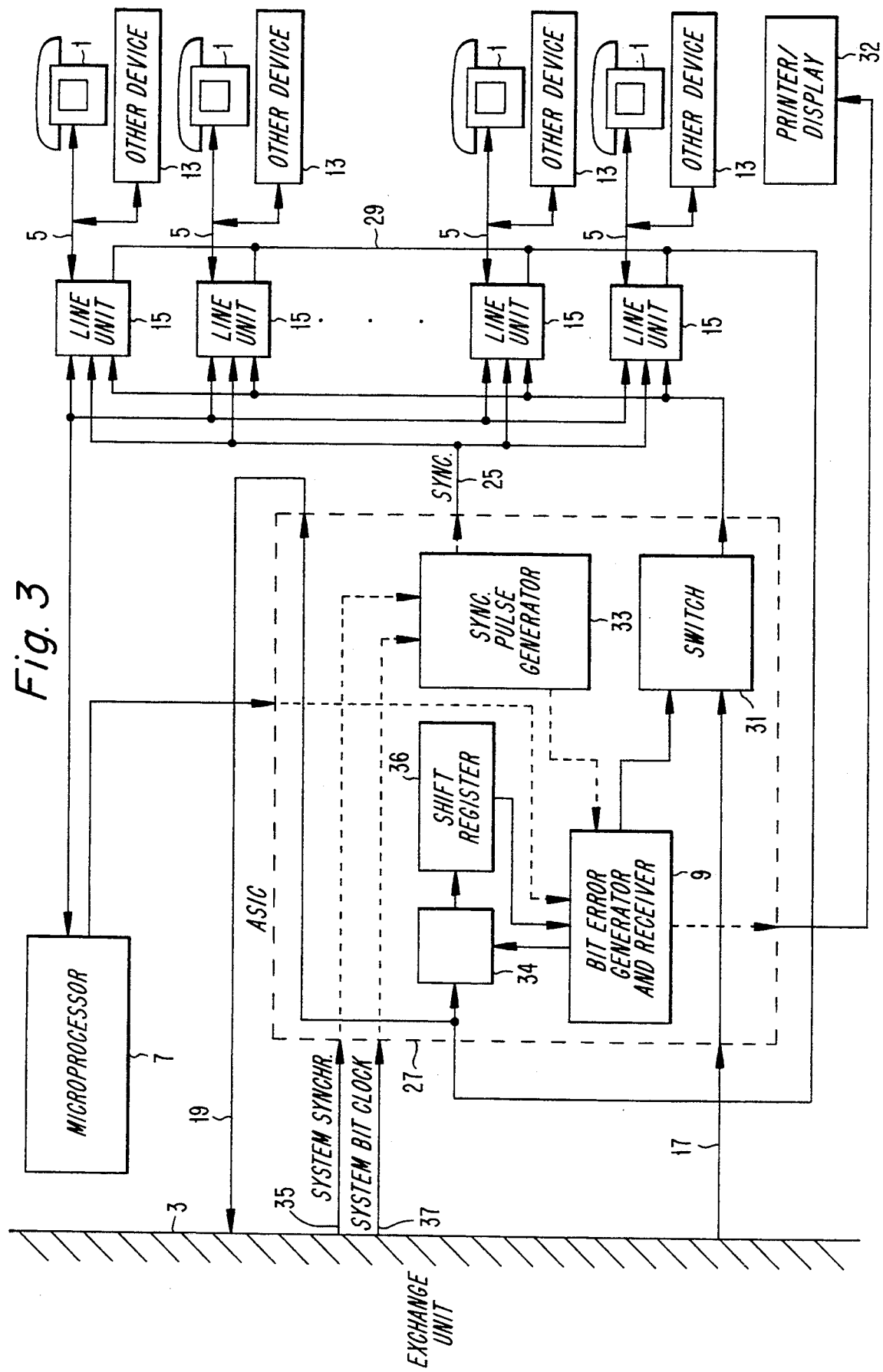
FIG. 3 shows a block diagram of another embodiment of the line testing device.
Figure 4A:
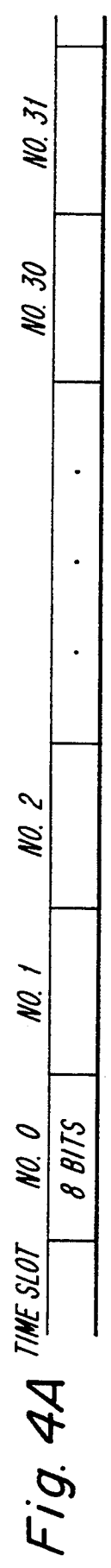
FIG. 4 illustrates the data format used in the transmission between the telephone exchange and the telephone set and also various synchronising pulses and clock pulses.
Figure 4B:
Figure 4C:
Figure 4D:
Figure 4E:
Figure 4F:
Figure 4G:

In fact, advantageously the register 21 and the switch 23 are substituted by a corresponding simple circuit controlled by a synchronizing pulse, see FIG. 3, such that when a suitable synchronizing pulse occurs, the bit sequence generator and receiver 9 forwards a section of the generated bit sequence, for instance a character, directly to the line 17, such that the earlier information is overwritten which is located just in the time slot corresponding to this character.

Instead of the register 21 and the switch 23 according to the embodiment of FIG. 2 in the embodiment according to FIG. 3 only one switch or multiplexer 31 is arranged, which has one of its two input terminals connected to the output line 17 of the exchange unit 3 and the other input line to the bit sequence generator and receiver 9. Its output terminal is the common single transmission line in the direction from the exchange unit 3 towards the line units 15.

In FIG. 4 is illustrated, beneath the general format of frames on the direct connections 17 and 19 to the exchange unit 3, clock and synchronizing signals. From the exchange unit 3 thus, see FIG. 2 and 3, on a line 35 a system synchronizing signal arrives having only one pulse at the beginning of each frame, and on the line 37 a system bit clock which is a clock signal for the individual data bits in the data transmission. By the ASIC circuit 27, in a clock pulse generator, schematically indicated at 33, based on these signals, a clock signal is generated, the pulses of which indicate the start of each time slot. Further, from this clock signal also pulse trains can be generated, each pulse train comprising only pulses indicating the start of a time slot having a specific order or sequential number in the frame and the corresponding signals are indicated at the lowermost portion of FIG. 4.

By means of such a pulse train, the start of a suitable time slot may be indicated in order that, during the time slot following this pulse, a suitably selected data byte of the pseudo random number sequence on the line 17 is inserted by means of such a signal pulse being fed to the switch 31 from the bit error generator/receiver 9. In the corresponding manner and by means of a signal pulse of such a pulse train a suitable data byte may be tapped from the line 29 for comparison in the bit sequence generator and receiver 9. Thus the input bit stream to the exchange on the line 29 from the line circuits 15, this line 29 continuing in the direct line 19 connected to the exchange 3, is input to a simple switching element 34. This switching element 34 is normally in an off-position, not letting any signals through. However, at the appropriate time, as controlled by the bit error and sequence generator 9, it may be switched to the on-state, letting the bitstream being fed into a shift register 36, for instance for storing eight consecutive bits. When the bits corresponding to a time slot have been entered in the register 36, the switching element 34 is again returned to the normal off-state. The bits stored in the shift register 36 are then tested by the bit error generator and receiver circuit 9.

In FIG. 3 also an output device as a printer or display is illustrated, being connected to and receiving signals from the bit error generator and receiver 9.

All the components illustrated in FIGS. 2 and 3, except the telephone exchange 3 and the telephone sets 1 and the possible other devices 13 and the output device 32, may be physically located on a single electronic circuit board or pattern board, not shown.

Figure 5:
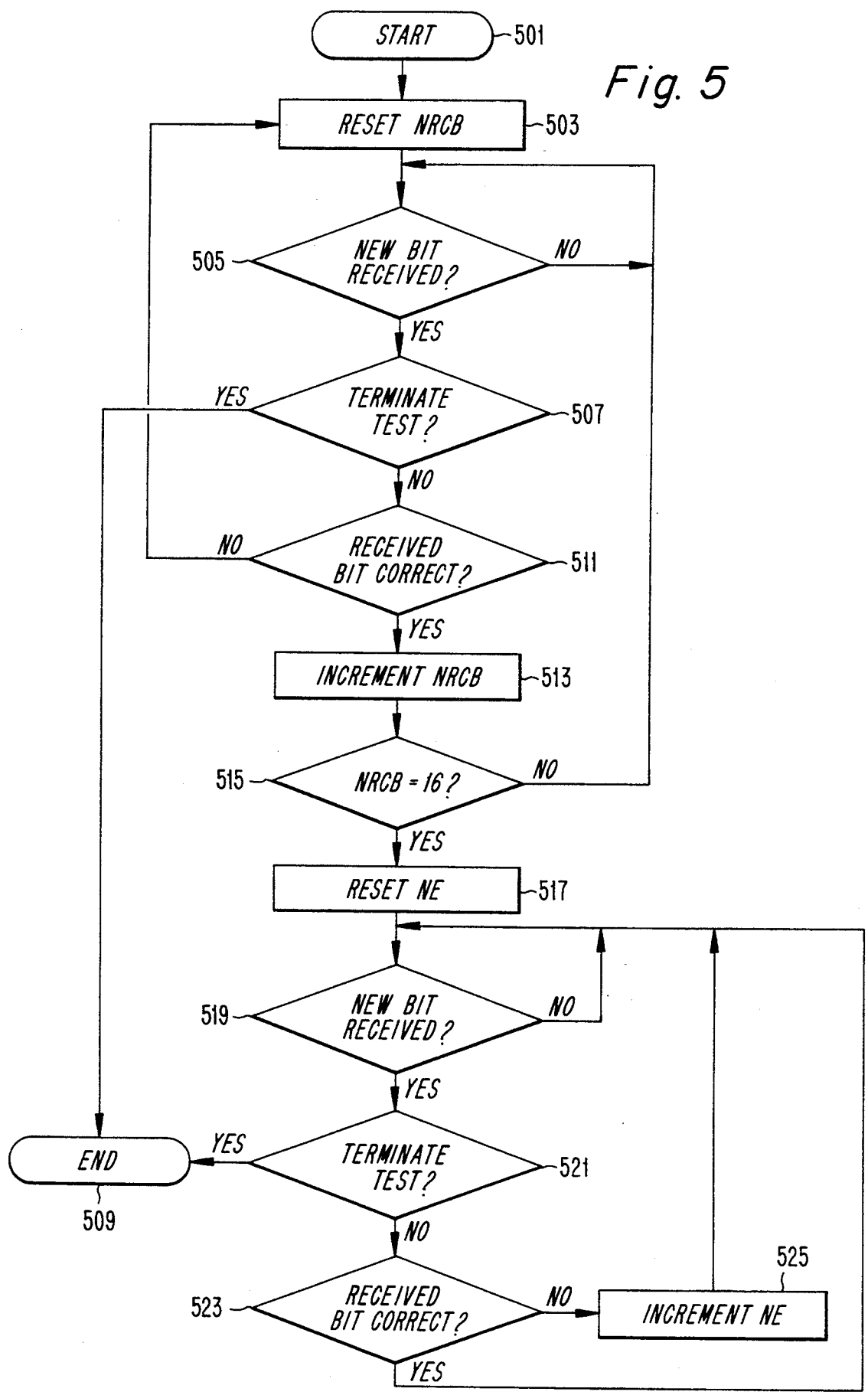
FIG. 5 shows a block diagram of the method for counting possible bit errors in the testing of a connection.

In FIG. 5 a flow diagram is shown of the procedure which can be performed by the bit sequence generator and receiver 9 in the counting of the number of transmission errors. After the random bit sequence has started to be forwarded, an indefinite time will follow until the forwarded random number bits return to the bit sequence generator and receiver 9. After this indefinite time period has elapsed, however, the bit sequences will arrive continuously with a new section in each time slot which has been assigned to the bit sequence and the corresponding line circuit 15 and telephone line 5. To decide that bits from the forwarded random number bit sequence have started to be received, all received bits are compared, until an agreement with the first transmitted 16 bits of the pseudo random number bit sequence is obtained. After that all occurring bit errors are counted, i.e. the lacks in the agreement between a received bit and the corresponding bit in the earlier forwarded section of the bit sequence.

This procedure is illustrated in more detail in FIG. 5 and starts here in a block 501. Then in a block 503 a counter NRCB is reset. After that it is decided in a block 505 if a new bit has been received. If it is not the case, again this test is made in the block 505. However, if a new bit has been received, it is decided in a block 507, if the test state still is valid or if the testing procedure is to be interrupted. If the line testing procedure is to be interrupted, the whole procedure ends in an end block 509. Otherwise the received bit is tested in a block 511, whether it agrees with the corresponding bit in the forwarded random number bit sequence. If there is no agreement, the procedure returns to the block 503 with a reset of the counter NRCB. If it is decided instead in the block 511 that the received bit is correct, the counter NRCB is incremented in a block 513 in order to be tested then in a block 515 whether this counter has achieved the value 16. If it is not the case the procedure again returns to the block 505 to determine if a new bit has been received.

If it instead is decided in the block 515, that the counter NRCB has achieved the value 16, another counter NE is reset in a block 517. Then it is tested like above in a block 519, whether a new bit has been received. This test is repeated until a new bit has been received. After that it is decided again in a block 521 whether the testing procedure is to be interrupted, and if it is the case, the procedure continues as above to the end block 509. If the line testing procedure is to continue, a received bit is tested in a block 523 to decide whether it agrees with the corresponding bit in the forwarded bit sequence. If an agreement is not obtained, the counter NE is incremented in a block 525 and then it is tested again in the block 515 if a new bit has been received. If it instead is decided in the block 523 that a received bit is correct, the procedure awaits the arrival of a new bit in the block 519.

When the procedure is terminated in the block 509, the number of discovered bit errors is stored in the variable NE.

What is claimed is:

1. A device for testing line connections at a digital telephone exchange, the exchange being arranged for the transfer of digital information and comprising:

line circuits, each line circuit being intended for connection through a line to a subscriber set and for forwarding bit sequences to and from the subscriber set;

pairs of input and output lines, each pair of one input line and one output line being connected to a group of line circuits, each group comprising at least two line circuits, thus on each pair of lines information being intended to be transmitted to and from subscriber sets connected to the line circuits of the corresponding group, the digital information being transmitted as bit sequences on the lines;

the testing device comprising:

a generator for generating a bit sequence;

a comparator for comparing a received bit sequence to a generated bit sequence;

means for indicating whether the received bit sequence agrees with the generated bit sequence;

wherein the testing device is connected to only one pair of an input and an output line of the exchange and further comprises:

means for inserting in a data stream on the output line and for extracting from a data stream on the input line of the pair, bit sequences transmitted to and from a selected one of the line circuits;

wherein communication from the exchange to a group of several line circuits is performed by means of time multiplexed serial transmission, such that each line circuit and thereby a connected subscriber set is always assigned fixed, periodical time slots; the inserting and extracting means are controlled by a signal such that after receiving the signal the inserting and extracting means directly transmits a portion of a bit sequence generated by the generator and having a predetermined length corresponding to a part of or a whole time slot on the output line of the exchange; the inserting and extracting means comprises intermediate storage means, connected to the output line of the exchange, for storing information in successive time slots for at least each one of the line circuits, the generator being arranged to store a portion of a generated bit sequence in a place in the intermediate storage means, the place corresponding to a time slot associated with a selected line circuit, when information associated with the line circuits are intermediately stored in the storage means.

2. A device for testing line connections at a digital telephone exchange, the exchange being arranged for the transfer of digital information and comprising:

line circuits, each line circuit being intended for connection through a line to a subscriber set and for forwarding bit sequences to and from the subscriber set;

pairs of input and output lines, each pair of one input line and one output line being connected to a group of line circuits, each group comprising at least two line circuits, thus on each pair of lines information being intended to be transmitted to and from subscriber sets connected to the line circuits of the corresponding group, the digital information being transmitted as bit sequences on the lines;

the testing device comprising:

a generator for generating a bit sequence;

a comparator for comparing a received bit sequence to a generated bit sequence;

means for indicating whether the received bit sequence agrees with the generated bit sequence;

wherein the testing device is connected to only one pair of an input and an output line of the exchange and further comprises:

means for inserting in a data stream on the output line and for extracting from a data stream on the input line of the pair, bit sequences transmitted to and from a selected one of the line circuits;

wherein communication from the exchange to a group of several line circuits is performed by means of time multiplexed serial transmission, such that each line circuit and thereby a connected subscriber set is always as signed fixed, periodical time slots; the testing device is included in a digital telephone exchange in which each line circuit reads from and inserts into, in a correct time slot, information being transferred on the output and input line of the exchange, the information also including control information transmitted by a control unit, wherein, in a start of a transmission of a bit sequence generated by the generator the control unit also transmits control information to the line circuit, which corresponds to the time slot in which the bit sequence is transmitted, which control information is intended to be received by a subscriber set connected to the line circuit, the subscriber set being arranged to retransmit the received bit sequence on receiving the control information.

* * * * *